Patented Sept. 11, 1945

2,384,428

UNITED STATES PATENT OFFICE 2,384,428

PRODUCTION OF ZIRCONIA

Mojzesz Ozjasz Axt, London, England, assignor to F. W. Berk and Company Limited, London, England No Drawing. Application June 10, 1942, Serial No. 446,525. In Great Britain September 12, 1941

5 Claims. (Cl. 23—140)

This invention relates to an improved process for the prodution of zirconia.

An acid solution of a titanium salt, the acid being sulphuric, nitric, hydrochloric or acetic, when heated, hydrolyses, producing a white insoluble compound. Only a fairly strong acidity will prevent the hydrolysis of titanium salts.

The concentration may reach 200 gms. of $TiO_2$ per litre and the time taken for the hydrolysis is between 8 hours (the usual process) and 2 hours when using "nuclei."

Zirconium salts behave quite differently. Only very dilute solutions (about 2–4 gms. of $ZrO_2$ per litre) will hydrolyse in a practically acid-free solution, producing a colloidal compound which it is impossible to filter and wash. The yield is very small, being between 20 and 60%.

According to some authors, a highly concentrated solution of the "neutral" sulphate (50 gms. of $Zr(SO_4)_2$ in 60 ccs. of $H_2O=364$ gms. of $ZrO_2$ per litre) when boiled for a considerable time yields a slightly soluble compound of the formula: $2ZrO_2.3SO_3.5H_2O$. Chauvenet (Ann. Chim. Phys. [9], 13, (1920), 59) denied the existence of such a compound and we have never succeeded in preparing it.

Cochet (13th Congrès de Chimie Industrielle, 1933, page 704) claims to have prepared a basic compound according to the approximate formula $2ZrO_2.SO_3.3H_2O$, by hydrolysing the normal sulphate at a pH of 4.6. It is difficult to understand this statement because a solution of zirconium sulphate is always strongly acid and by neutralising the acid $Zr(OH)_4$ is precipitated quantitatively at a pH of 4.2–4.4.

Hauser (Zeit. Anorg. Chem., 45, (1905), pages 185–224 and 54, (1907), pages 192–216) describes a basic sulphate: $4ZrO_2.3SO_3.15H_2O$, prepared by crystallising or hydrolysing a neutral solution of zirconium sulphate at 39.5° C. for 12 days. The concentration was approximately 29 gms. of $ZrO_2$ per litre. No mention is made of the yield of this process.

Marden and Rich (Investigation of Zirconia, Washington, 1921, page 54) describe Hauser's process in detail. When starting from zircon ores the dilution should be between 15 gms. and 2.5 gms. per litre. The presence of sodium and potassium sulphates interferes with the hydrolysis. The best results (58%) were obtained when starting from zirconium sulphate and calcining at 650° C. and using a concentration of 5.45 gms. of $ZrO_2$ per litre. The process lasted three days at 39.5° C., but if continued over three days it would yield better results.

According to Von Hevesy and Cremer (Zeit. Anorg. Chem., 195, (1931), 339), $Zr(SO_4)_2$ is stable up to 400° C. After this it decomposes into $ZrO_2$.

Hauser's process has been studied and it was found that there are too many conditions to be observed in order to obtain consistent results. Under the best conditions a yield of 65% was obtained with a concentration of 13 gms. of $ZrO_2$ per litre at a temperature of 39° C. for 5 days. It was impossible to improve the yield by neutralising the acid.

$$4Zr(SO_4)_2 + 20H_2O \rightarrow 4ZrO_2.3SO_3.15H_2O + 5H_2SO_4$$

There is no further hydrolysis after neutralising the acid with an alkali.

According to Marden and Rich (Investigation of Zirconia, page 16), $Zr(SO_4)_2.H_2SO_4.3H_2O$ crystallises from a solution containing 61% $SO_3$ after 12 days when maintained at temperature of 39 to 40° C. This compound behaves as above.

Another attractive process is the crystallisation of the oxychloride $ZrOCl_2.8H_2O$. Theoretically the $ZrOCl_2.8H_2O$ crystallises out from a concentrated hydrochloric solution, and this compound is said to be very pure and even free from hafnium (celtium) which invariably accompanies the $ZrO_2$.

This process is extremely difficult to carry out on an economical commercial scale. The hydrochloric acid solution of zirconia must be evaporated almost to dryness on the water bath. The crystalline mass which separates out on cooling is re-dissolved in hot concentrated hydrochloric acid and allowed to cool. After standing for 24 to 48 hours, the crystals are filtered free from the mother liquor and washed thoroughly with cold concentrated hydrochloric acid. Several, sometimes as many as eight, such crystallisations are required to obtain pure $ZrOCl_2.8H_2O$. Upon calcination this compound decomposes into $ZrO_2$ but it is impossible to expel the last traces of chlorine even after prolonged heating.

Crystallisation from sulphuric or hydrochloric acid solutions is rather a separation from impurities than a definite operation. Usually the compounds are dissolved in water and reprecipitated with an alkali before finally calcining. Direct calcining of products obtained from sulphuric acid crystallisation yields a fine product, but takes from 8 to 10 hours to expel the last traces of $SO_3$.

These difficulties explain why zirconia salts have not gained the same footing on the market as those of titanium.

The only way of preparing a pure and cheap zirconia is by hydrolysis. Various authors claim to have succeeded on these lines by hydrolysing under pressure, but the apparatus is too complicated to find application on a large commercial scale. These operations are in general carried out in the presence of sulphuric acid and hydrochloric acid.

According to the present invention a process is provided for the production of zirconia wherein a solution of zirconium sulphate containing no excess acid and free from alkali salts which form double compounds with zirconium sulphate is hydrolysed in the presence of calcium sulphate, calcium chloride or calcium nitrate and in the absence of a large proportion of magnesium sulphate and the product obtained is calcined to produce zirconia.

The presence of one of the aforesaid calcium salts has the following advantages. It lowers the temperature of hydrolysis, increases the yield up to 88 to 89%, produces a crystalline, powdered, basic zirconium compound which can be easily filtered, washed and directly calcined. It also allows a temperature of about 100° C. to be used in the hydrolysis which can be carried out in 70–80 minutes.

When starting from a product obtained by heating a zirconium ore with lime with subsequent treatment with sulphuric acid, the amount of calcium chloride to be added is smaller than in other cases owing to the presence of a certain amount of calcium sulphate (2 gms. of $CaSO_4$ per 30 gms. of $ZrO_2$ per litre).

When treating zircon sand, where there are only relatively small amounts of iron present, the hydrolysis may be carried out without reducing the iron to the ferrous state. In the case of other ores, where there is a larger amount of iron present, it is advisable to reduce this element to the ferrous state with a reducing agent such as sulphur dioxide or nascent hydrogen.

The hydrolysis of zirconium salts on the same lines as that of titanium salts is quite a new process. According to Hopkins ("Chemistry of the Rarer Elements," 1939, Champaign, Illinois), "The normal sulphate is easily hydrolysed, yielding a solution with a strong acid reaction. Such a solution yields no precipitates."

The following example illustrates how the process of the invention may be carried into effect:

The initial material is zircon sand containing:

|  | Per cent |
|---|---|
| Silica ($SiO_2$) | 32.25 |
| Zirconia ($ZrO_2$) | 66.70 |
| Iron ($Fe_2O_3$) | 0.13 |
| Titanium ($TiO_2$) | 0.18 |

This material is disintegrated and brought into solution by mixing 100 kg. of the zircon sand with 100 kg. of quicklime slaked with 160 liters of water containing 10 kg. of anhydrous calcium chloride, introducing the resulting wet paste into a rotary furnace and gradually heating to 1200°–1250° C. and maintaining this temperature for two hours, grinding the cooled clinker (202 kg.) to 150 mesh fineness, introducing it into a vessel containing 292 kg. of concentrated sulphuric acid (specific gravity 1.83) and mixing until the temperature rises to 210° C., heating the wet paste to complete dryness, leaching the mixture without grinding with 1000 liters of hot water and stirring for three hours, and filtering.

The resulting solution has the following composition:

|  | Grams per litre |
|---|---|
| $ZrO_2$ | 29.31 |
| $SO_3$ | 31.80 |
| $Fe_2O_3$ | 0.02 |
| $TiO_2$ | 0.01 |
| $CaSO_4$ | 1.98 |

200 litres of this solution containing 5862 gms. of $ZrO_2$ are diluted with water to about 500 litres. 2 kgms. of commercial calcium chloride dissolved in 100 litres of water are added and the whole made up to 1000 litres with water. The mixture is heated to 100° C. and maintained at this temperature for 75 minutes. The mixture is filtered and washed with water until substantially free from calcium chloride and calcium sulphate. The residue is dried at 70° C., ground and washed with hot water until completely free from calcium sulphate. It is then calcined at 950° C. until free from $SO_3$. 5180 gms. of zirconia are obtained (yield = 88.5% of the theoretical) having a purity of 99.62%. The product contains 0.08% of $Fe_2O_3$ and 0.06% of $TiO_2$.

It will be understood that when the solution is hydrolyzed in the presence of calcium chloride or the like, zirconium sulphate or zirconium chloride hydrolyzes in water, but there is no precipitation, and the object of the present invention is to precipitate the zirconium oxide in the form of a basic sulphate.

The state of affairs when zirconium sulphate is dissolved in water can be expressed by the following equation:

$$Zr(SO_4)_2 + H_2O \rightleftharpoons ZrOSO_4 + H_2SO_4$$

I claim:

1. A process for the production of zirconia which comprises hydrolyzing a solution of zirconium sulphate containing no excess acid and free from alkali metal salts, in the presence of a substantial amount of a compound selected from the group consisting of calcium chloride and calcium nitrate but not sufficient to react with all the sulphate ions present and in the absence of a substantial amount of magnesium sulphate to precipitate a basic sulphate of zirconium, and calcining the product thus obtained to produce zirconia.

2. A process for the production of zirconia which comprises treating a solution of zirconium sulphate containing no excess acid and free from alkali metal salts and containing a ferric compound with a reducing agent to reduce the ferric compound to the ferrous state and hydrolyzing the solution thus obtained in the presence of a compound selected from the group consisting of calcium chloride and calcium nitrate but not sufficient to react with all the sulphate ions present and in the absence of a substantial amount of magnesium sulphate to precipitate a basic sulphate of zirconium and calcining the product thus obtained to produce zirconia.

3. A process for the production of zirconia which comprises hydrolyzing during a period of 70 to 80 minutes a solution of zirconium sulphate containing no excess acid and free from alkali metal salts in the presence of a substantial amount of a compound selected from the group consisting of calcium chloride and calcium nitrate but not sufficient to react with all the sulphate ions present and in the absence of a substantial amount of magnesium sulphate to precipitate a basic sulphate of zirconium, and calcining the product thus obtained to produce zirconia.

4. A process for the production of zirconia which comprises hydrolyzing at a temperature of 100° C. during a period of 70 to 80 minutes a solution of zirconium sulphate containing no excess acid and free from alkali metal salts in the presence of a substantial amount of a compound selected from the group consisting of calcium chloride and calcium nitrate but not sufficient to react with all the sulphate ions present and in the absence of a substantial amount of magnesium sulphate to precipitate a basic sulphate of zirconium, and calcining the product thus obtained to produce zirconia.

5. A process for the production of zirconia which comprises preparing from zircon sand a solution of zirconium sulphate the other constituents of which consists substantially only of traces of the oxides of iron and titanium and less than 2% of calcium sulphate, hydrolyzing said solution at about 100° C. for a period of 70 to 80 minutes in the presence of about 34% by weight of commercial calcium chloride calculated upon the $ZrO_2$ content of the solution, and calcining the product thus obtained to produce zirconia.

MOJZESZ OZJASZ AXT.